(12) United States Patent
Nagai

(10) Patent No.: US 8,767,266 B2
(45) Date of Patent: Jul. 1, 2014

(54) IMAGE PROCESSING APPARATUS AND IMAGE PROCESSING METHOD FOR REDUCING THE AMOUNT OF CONSUMPTION OF RECORDING MATERIAL

(75) Inventor: Jun Nagai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 145 days.

(21) Appl. No.: 13/560,526

(22) Filed: Jul. 27, 2012

(65) Prior Publication Data

US 2013/0038908 A1  Feb. 14, 2013

(30) Foreign Application Priority Data

Aug. 11, 2011 (JP) ................................. 2011-176191

(51) Int. Cl.
*H04N 1/40* (2006.01)
*H04N 1/387* (2006.01)
(52) U.S. Cl.
USPC ............. 358/3.23; 358/1.2; 358/1.8; 358/1.9; 358/3.01; 358/3.02; 358/3.06; 358/3.1; 358/3.11; 358/3.12; 358/3.21; 358/3.26; 358/504; 358/512; 358/461; 382/168; 382/169; 382/170; 382/171; 382/172; 382/175; 382/254; 382/267; 382/275; 347/15; 347/172; 347/175; 347/183; 347/232; 399/39; 399/49; 399/72; 399/394
(58) Field of Classification Search
CPC ....................................................... H04N 1/605
See application file for complete search history.

(56) References Cited

U.S. PATENT DOCUMENTS

| | | | |
|---|---|---|---|
| 5,751,434 A * | 5/1998 | Narendranath et al. | 358/1.9 |
| 7,643,173 B2 | 1/2010 | Komatsu | |
| 8,243,335 B2 | 8/2012 | Nagai | |
| 8,243,352 B2 | 8/2012 | Nakashio | |
| 2002/0041770 A1 * | 4/2002 | Nakazato et al. | 399/49 |
| 2002/0191204 A1 * | 12/2002 | Nishi et al. | 358/1.9 |
| 2006/0056683 A1 * | 3/2006 | Komatsu | 382/162 |
| 2008/0259367 A1 * | 10/2008 | Oka | 358/1.9 |
| 2010/0165032 A1 * | 7/2010 | Yoshida | 347/15 |
| 2010/0231936 A1 | 9/2010 | Nagai | |
| 2011/0116114 A1 | 5/2011 | Nagai | |
| 2012/0050766 A1 * | 3/2012 | Saiki | 358/1.9 |
| 2012/0229819 A1 | 9/2012 | Koyatsu et al. | |

FOREIGN PATENT DOCUMENTS

| | | | |
|---|---|---|---|
| JP | 2006-068982 A | 3/2006 |
| JP | 2006-251102 A | 9/2006 |
| JP | 2009-117952 A | 5/2009 |
| JP | 2011257669 A | 12/2011 |

OTHER PUBLICATIONS

British Combined Search and Examination Report, dated Jan. 18, 2013, in corresponding British Application No. 1212828.6.
German Office Action dated Oct. 10, 2013 in counterpart German Patent Appl. No. 102012214294.0.

* cited by examiner

*Primary Examiner* — Miya J Cato
(74) *Attorney, Agent, or Firm* — Fitzpatrick, Cella, Harper & Scinto

(57) ABSTRACT

There is provided an image processing apparatus which can suppress degradation of an image quality in a recording material save mode processing and obtain an effect of consumption amount reduction of recording material desired by a user at low costs. A recording material consumption amount at the time of applying first color conversion processing unit is predicted corresponding to inputted image data. The setting of a second color conversion processing is changed from a prediction value and a target value of the recording material consumption amount.

8 Claims, 12 Drawing Sheets

IMAGE PROCESSING APPARATUS AND IMAGE PROCESSING METHOD FOR REDUCING THE AMOUNT OF CONSUMPTION OF RECORDING MATERIAL

BACKGROUND OF THE INVENTION

1. Field of the Invention

The present invention relates to an image processing apparatus and an image processing method, and particularly, to an image processing apparatus and an image processing method for controlling a usage amount of recording material.

2. Description of the Related Art

In an image processing apparatus equipped with a print function, there are increasing occasions for printing data produced by a personal computer or the like. At printing, the image processing apparatus uses recording material such as toner or ink to form an image using a method such as an inkjet recording method or an electrophotographic method. The consumption amount of the recording material such as the toner or the ink for this image formation has a great impact on running costs of the image processing apparatus. Therefore there is known an image processing apparatus equipped with a recording material save mode function with the aim of reducing the consumption amount of the recording material, which is called, for example, an ink save mode or a toner save mode.

As a general method for realizing such a reduction function in this recording material, there is considered, for example, a method in which, in a case where a recording material save mode is selected, a reduction processing is executed on an entire image to execute a thinning processing of dots, thus reducing a consumption amount of the recording material. In addition, there is also a method in which, in a case where the recording material saving mode is selected at printing, a density control processing, different from that of a regular print mode, is executed in the density control processing to reduce an output density, thus reducing a consumption amount of the recording material.

In the realization of the recording material save mode in the conventional method described above, the consumption amount of the recording material is decreased over the entire image. Therefore there are some cases where the density of the entire image drops as compared with the image printed by a regular print mode, resulting in degradation in print quality.

Therefore, there is proposed a method in which the consumption amount of the recording material is reduced and also the image quality is less degraded. For example, it is proposed in Japanese Patent Laid-Open No. 2009-117952 to perform a printing with a quality close to that in the regular mode, by producing in advance a color conversion parameter, where a total applied amount of recording material is suppressed. There is also a method for realizing the recording material save mode in such a manner as not to degrade a print quality by performing a color gamut compression in a perceived color space (for example, refer to Japanese Patent Laid-Open No. 2006-68982).

It is known that the reduction amount of the recording material, upon changing the color conversion parameter, differs depending on a kind of an image to be printed, in the recording material save mode with the aim of suppression of the quality degradation of the image described above. In the image processing apparatus disclosed in Japanese Patent Laid-Open No. 2009-117952, however, a user cannot accurately recognize the extent to which the consumption amount of the print amount is reduced by changing the color conversion parameter. Therefore there is a problem that upon selecting the print mode, the consumption amount of the recording material cannot be reduced properly according to a target reduction amount. In the image processing apparatus disclosed in Japanese Patent Laid-Open No. 2006-68982, there is estimated and selected a color conversion parameter by which a reduction amount of recording material may be the closest to that desired by a user. Therefore it is required to retain a plurality of color conversion parameters, creating a problem with an increase in cost upon putting this image processing apparatus into practice.

SUMMARY OF THE INVENTION

The present invention is made in view of the foregoing problem, and an aim of the present invention is to provide an image processing apparatus and an image processing method which can suppress degradation of an image quality in a recording material save mode processing and can obtain an effect of consumption amount reduction of recording material desired by a user at low costs.

The present invention provides an image processing apparatus as set out in claim 1. The present invention also provides an image processing method set out in claim 9. The present invention further provides a program as set out in claim 11.

An image processing apparatus according to an embodiment of the present invention comprises a first processing means for performing color conversion to input image data in such a manner that a consumption amount of recording material by image formation of each pixel is equal to or less than a threshold, a predicting means for predicting the consumption amount of the recording material by the image formation of an entire image data processed by the first processing unit, and a second processing means for using a reduction target value of the recording material and an adjustment value calculated corresponding to (based on) a prediction value by (from) the prediction means to execute a density adjustment processing to (on) the image data processed by the first processing unit.

According to the present invention, it is possible to provide an image processing apparatus and an image processing method which can suppress degradation of an image quality in a recording material save mode processing and can obtain an effect of consumption amount reduction of recording material desired by a user at low costs.

Further features of the present invention will become apparent from the following description of exemplary embodiments (with reference to the attached drawings).

DESCRIPTION OF THE EMBODIMENTS

The best mode for carrying out the present invention will be explained with reference to the accompanying drawings.

An explanation will be hereinafter made of a case where embodiments of the present invention are applied to a color laser printer using toners of CMYK (cyan, magenta, yellow, black) as recording material, but the subject of the present invention is not limited thereto. The present invention can be applied, for example, to an inkjet image processing apparatus which uses ink and to an electrophotographic image processing apparatus which uses toner.

Embodiment 1

Figure 1:
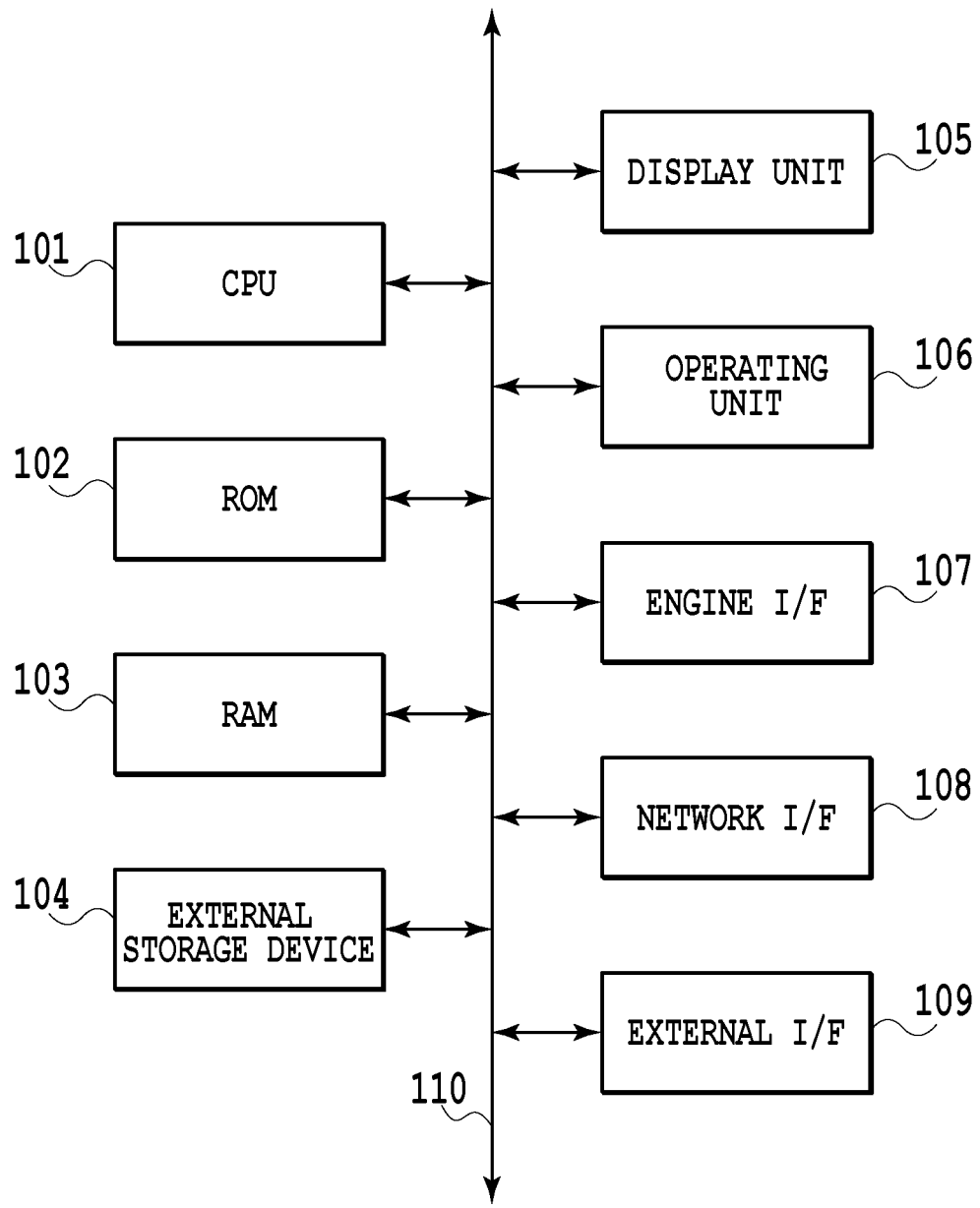
FIG. 1 is a block diagram showing a basic configuration of a printer controller for a color laser printer.

FIG. 1 is a block diagram showing a basic configuration of a printer controller for a color laser printer as an example of an image processing apparatus according to an embodiment in the present invention. The printer controller is provided with a CPU 101, a ROM 102, a RAM 103, an external storage unit 104, a display unit 105, an operating unit 106, an engine I/F (interface) 107, a network I/F 108, an external I/F 109, and a system bus 110.

The above configuration will now be described in more detail. The CPU 101 is a central processor unit for performing control, calculation processing and the like of an entire apparatus, and executing the respective processing to be described later, based upon programs stored in the ROM 102. The ROM 102 is a readout exclusive memory, and is a storage region of a system activating program and programs for performing control of a printer engine. The RAM 103 is a random access memory, in which a program or data is loaded for each of various processing for execution. In addition, the RAM 103 can be used as a data storage region of received image data. The external storage unit 104 is configured of, for example, a hard disc and the like, and is used as a working region in which data is spooled, and programs, each image data, data used at image processing and the like are stored. The display unit 105 comprises, for example, a liquid crystal display or the like, and is used for display of a setting state of the apparatus, and the present processing, an error state and the like inside the apparatus. The operating unit 106 is used for changing or resetting settings, and can perform display of an operational screen for indicating a print condition together with the display unit 105, and the like. The engine I/F 107 functions as a means for actually controlling the printer engine or exchanging measurement data and the like. The network I/F 108 functions as a means for connecting the present apparatus to the network through the network I/F 108. The external I/F 109 is connected to an external device via a parallel (serial) interface or the like. The system bus 110 forms part of a data path between the aforementioned configuration elements.

Figure 2:
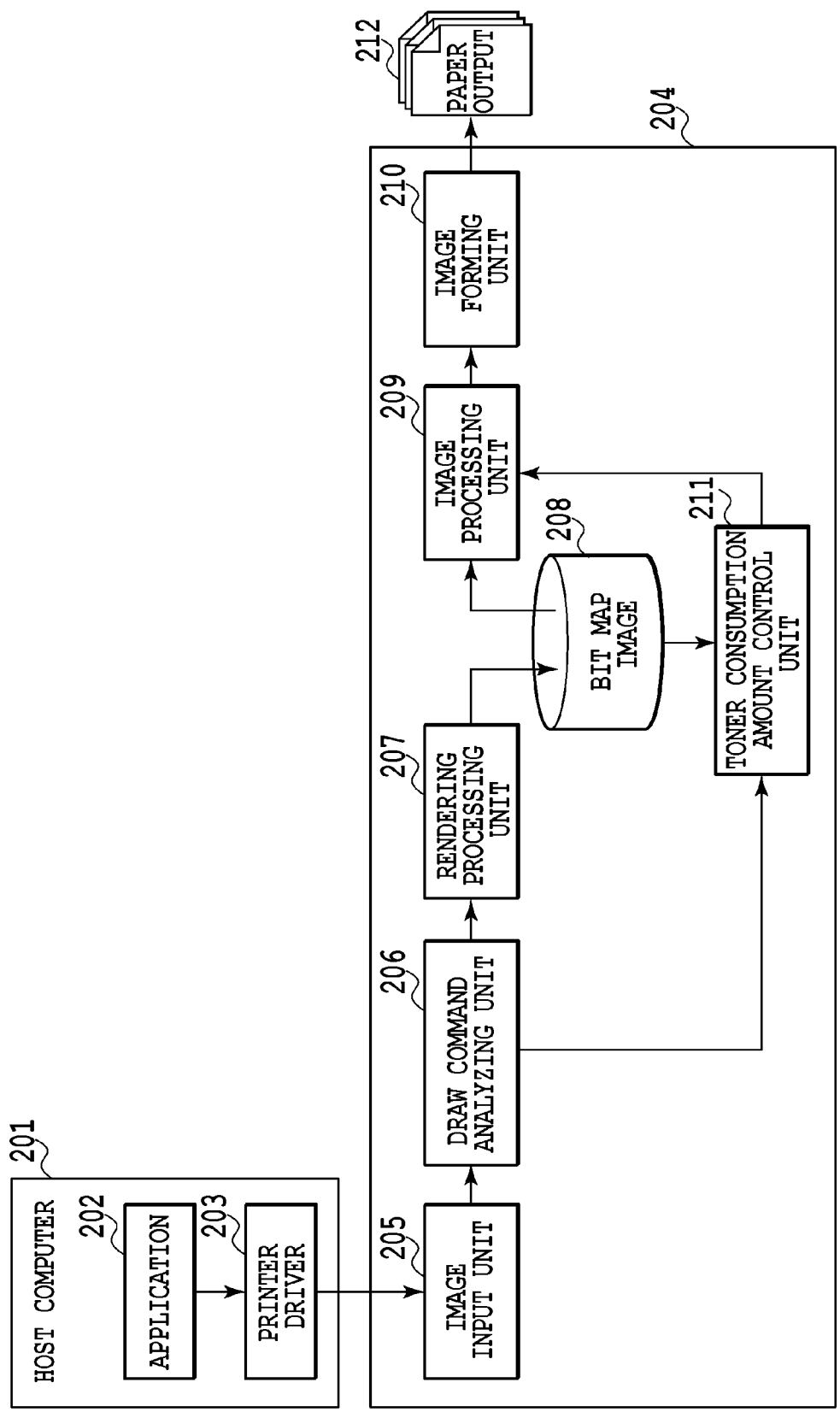
FIG. 2 is a block diagram showing the configuration of an image processing apparatus.

FIG. 2 is a block diagram showing the functional configuration of the image processing device (or the printer controller) according to the embodiment in the present invention.

A host computer 201 is a personal computer or the like, and establishes communications with an image processing device 204. An application 202 operating on the host computer 201 is used to produce various kinds of digital document data such as page layout documents, word processor documents, graphic documents, and the like. Draw command (s) are generated via a printer driver 203 based upon the produced digital document data. The generated draw command is sent to the image processing device 204.

The draw command to be produced herein is a page description language for producing page image data, which is called PDL (Page Description Language). The draw command regularly includes draw commands for image data such as images, graphics, texts and the like, and also includes print settings in regard to, for example, print copies, a page layout, and print order, as control commands. These print settings include also a setting of a toner save mode for reducing a consumption amount of the toner for printing, in contrast to a regular mode for performing a regular print. As the setting of the toner save mode, information that an operating mode is the toner save mode is provided, as well as a target value for the toner save is also set. As the target value, for example, a reduction ratio (50% of reduction, and the like) of the consumption amount of the toner relative to the regular mode, and the like are set. The draw command sent from the host computer 201 is inputted to the image processing device 204 from the image input unit 205.

Next, a draw command analyzing unit 206 analyzes the draw command inputted from the image input unit 205, and thereby produces a draw object as an intermediate language which can be processed by a rendering processing unit 207. In addition, at this time, the draw command analyzing unit 206 also extracts print setting information included in the draw command, for example, control information in regard to print settings of the toner save mode and the like. In a case where the toner save mode is set, the information is sent also to a toner consumption amount control unit 211.

Next, the rendering processing unit 207 produces a bit map image 208 by performing a rendering processing.

An image processing unit 209 executes image processing such as a color conversion processing, a density adjustment processing, and a halftone processing to the generated bit map image 208, thereby producing print image data capable of being outputted by an image forming unit 210. The processing applied by the image processing unit 209 is changed by a set print setting (for example, a regular mode, a toner save mode, or the like). The details of the processing in the image processing unit 209 will be described later.

The image forming unit 210 receives input of the print image data generated by conversion into an image format in advance defined by the image processing unit 209, as a video signal. The image forming unit 210 executes a print processing based upon the inputted video signal. That is, the print processing is a printing operation of an image on a medium such as paper, and is completed through processing of exposure, development, transfer, and fixation.

Figure 3:
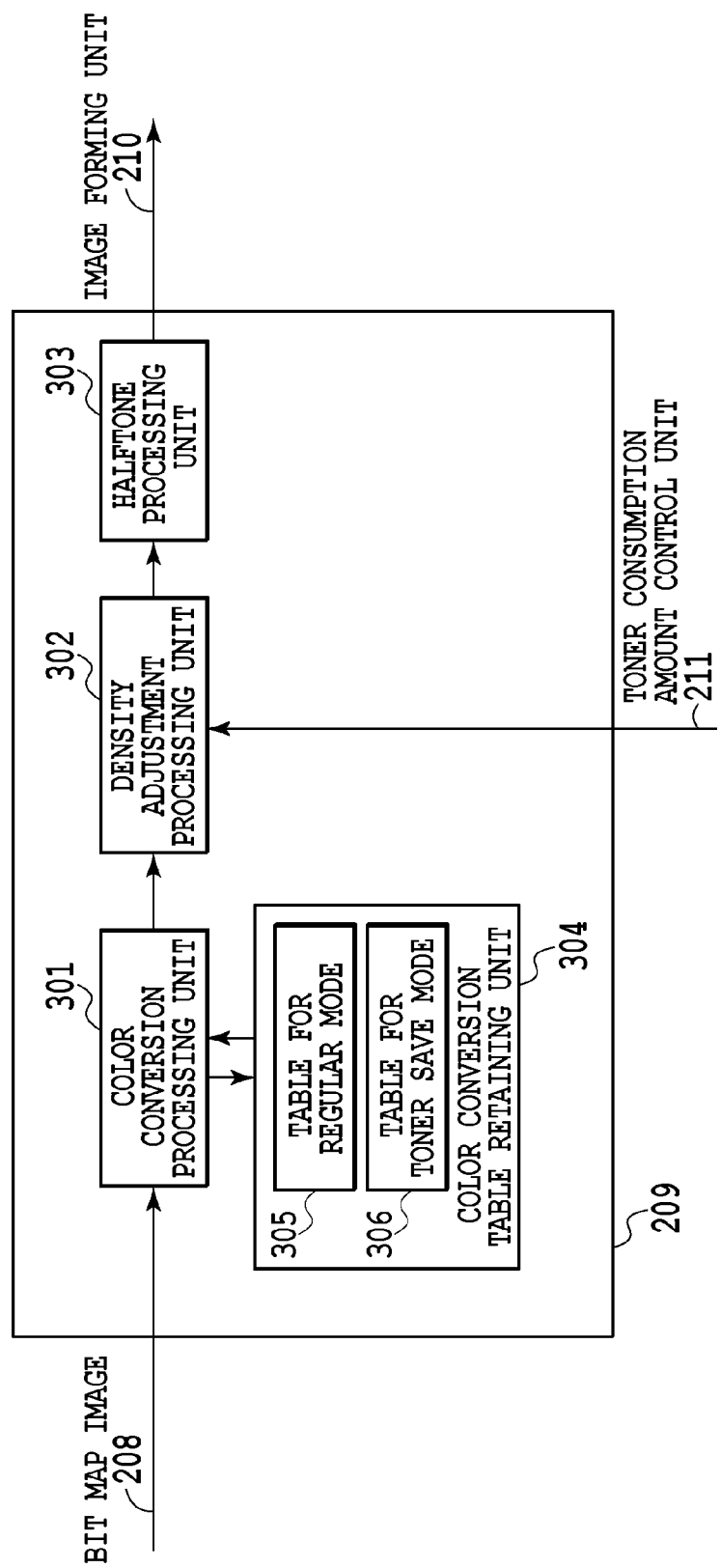
FIG. 3 is a block diagram showing a functional configuration of an image processing unit.

FIG. 3 is a block diagram showing a functional configuration of the image processing unit 209. In a case where input to the image forming unit 210 is image data corresponding to toners of four colors of CMYK and the bit map image 208 is RGB color space image data, a color conversion processing unit 301 (first processing means) executes a processing of converting the bit map image 208 to the CMYK color space image data. The color conversion processing unit 301 executes a color conversion processing by applying a color conversion table retained in a color conversion table retaining unit 304. The color conversion table to be applied is switched corresponding to the set print setting. That is, in a case where the print setting is a regular mode, a color conversion table for regular mode is applied and in a case where the print setting is a toner save mode, a table for toner save mode is used.

A method for using a three-dimensional LUT (three-dimensional lookup table) is an example of a color conversion processing method. The next table 1 shows an example of a three-dimensional LUT as the color conversion table.

TABLE 1

| Input RGB data | | | Output CMYK data | | | |
|---|---|---|---|---|---|---|
| R | G | B | C | M | Y | K |
| 255 | 255 | 255 | 0% | 0% | 0% | 0% |
| 255 | 255 | 216 | 0% | 0% | 15% | 0% |
| 255 | 255 | 180 | 0% | 0% | 29% | 0% |
| 255 | 255 | 144 | 0% | 0% | 44% | 0% |
| 255 | 255 | 108 | 0% | 0% | 58% | 0% |
| 255 | 255 | 72 | 0% | 0% | 72% | 0% |
| 255 | 255 | 36 | 0% | 0% | 86% | 0% |
| 255 | 255 | 0 | 0% | 0% | 100% | 0% |
| 255 | 216 | 255 | 0% | 15% | 0% | 0% |
| 255 | 216 | 216 | 0% | 15% | 15% | 0% |
| 255 | 216 | 180 | 0% | 15% | 29% | 0% |
| 255 | 216 | 144 | 0% | 15% | 44% | 0% |
| 255 | 216 | 108 | 0% | 15% | 58% | 0% |
| 255 | 216 | 72 | 0% | | | 0% |
| 255 | 216 | 36 | | | | |
| . | | | | | | |
| . | | | | | | |
| . | | | | | | |
| | | | 56% | 42% | 0% | 44% |
| | | | 42% | 28% | 0% | 58% |
| 0 | 36 | 72 | 28% | 14% | 0% | 72% |
| 0 | 36 | 36 | 14% | 0% | 0% | 86% |
| 0 | 36 | 0 | 14% | 0% | 14% | 86% |
| 0 | 0 | 255 | 100% | 100% | 0% | 0% |
| 0 | 0 | 216 | 85% | 85% | 0% | 15% |
| 0 | 0 | 180 | 71% | 71% | 0% | 29% |
| 0 | 0 | 144 | 56% | 56% | 0% | 44% |
| 0 | 0 | 108 | 42% | 42% | 0% | 58% |
| 0 | 0 | 72 | 28% | 28% | 0% | 72% |
| 0 | 0 | 36 | 14% | 14% | 0% | 86% |
| 0 | 0 | 0 | 0% | 0% | 0% | 100% |

Figure 4:
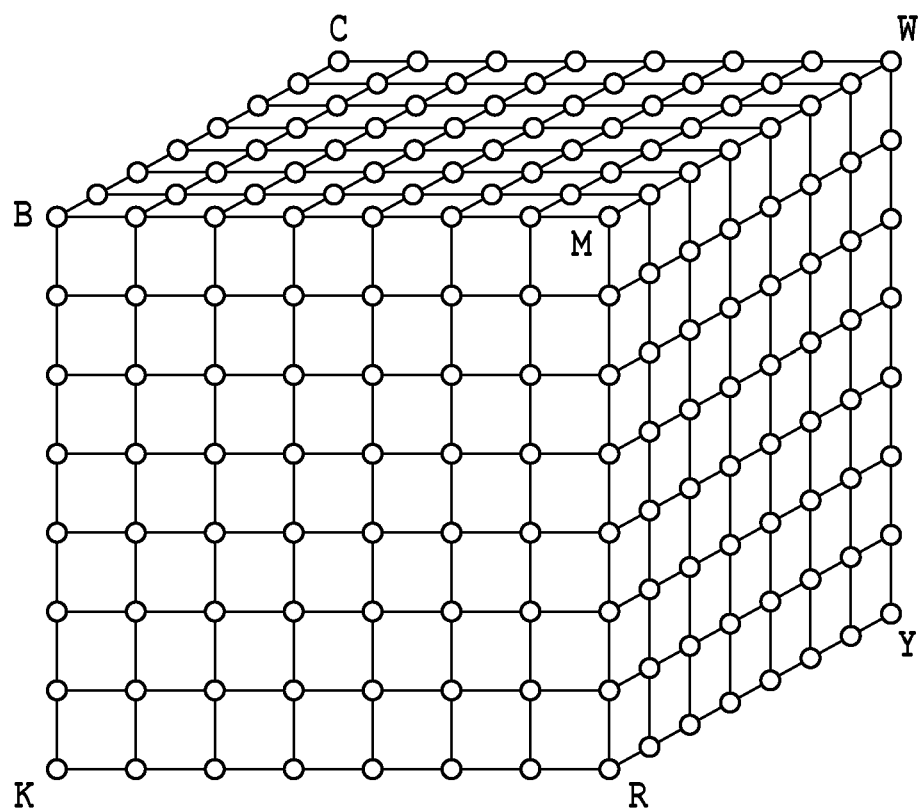
FIG. 4 is a diagram showing an example of a three-dimensional LUT as a color conversion table.

This table is a retrieval table expressing a corresponding relation for converting RGB data to CMYK data. Since this table is configured of lattice points of N×N×N pieces, it is possible to perform the color conversion with accuracy in principle by sufficiently narrowing lattice intervals. In fact, however, the number of the lattice points is limited because of restrictions in a memory capability, processing speeds and the like, and it is rare that a point as a target for the color conversion falls on the lattice point. Therefore a color value after the conversion processing is found by a three-dimensional interpolation processing. At the three-dimensional interpolation processing, the three-dimensional LUT shown in Table 1 is expressed by a cube as shown in FIG. 4, wherein the interpolation processing is executed. Since the interpolation processing is a well-known technology, a detailed explanation thereof is omitted.

As described above, in a case where the toner save mode is set, a color conversion table for toner save mode is applied to execute the color conversion processing. In the color conversion table for toner save mode, an amount of applied toner of data in each lattice point is reduced compared to the color conversion table for regular mode, for example. Here, at the time of executing the three-dimensional interpolation processing from the lattice points, if the amount of applied toner of the data on the lattice point is controlled, the data obtained from the lattice point by the interpolation processing does not exceed the data amount. Therefore the control of the amount of applied toner at color conversion processing is only required to be performed in regard to the data on the lattice point. The amount of applied toner on the lattice points becomes a total amount of signal values (density levels) of CMYK. That is, in a case of an example in Table 1, the amount of applied toner of the lattice points of RGB=(0, 0, 216) is 185% as a total amount of CMYK=(85, 85, 0, 15). Here, the amount of applied toner is an amount for indicating a consumption amount of recording material upon forming an image on a print medium, by signal values.

Figure 5:
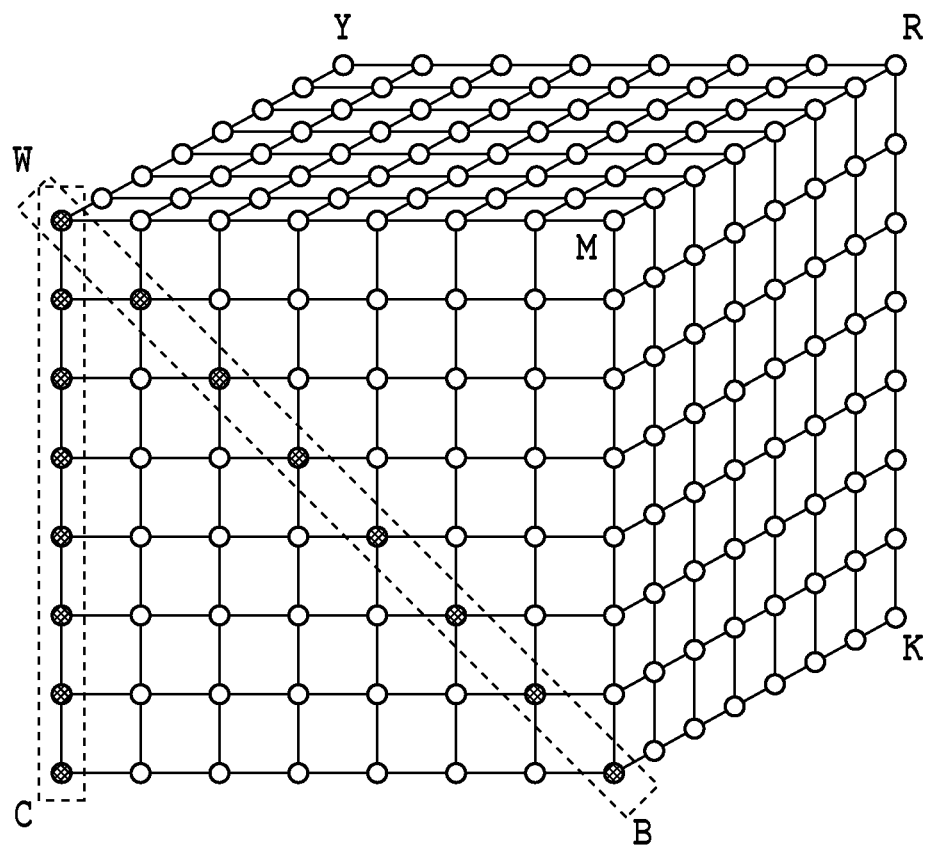
FIG. 5 is a diagram showing an example of a three-dimensional LUT as a color conversion table.

FIG. 5 is a diagram explaining a difference between color conversion tables for regular mode and toner save mode, and viewing the color conversion table shown in FIG. 4 at a different angle.

Hereinafter, an explanation will be made of an example in which a limit value of an amount of applied toner of the color conversion table for regular mode is 200%, and a limit value of an amount of applied toner of the color conversion table for toner save mode is 100%.

The next table 2 shows a color conversion table for regular mode in regard to data of lattice points from white (W) to cyan (C) among the lattice point data in the color conversion table.

TABLE 2

| R | G | B | C | M | Y | K | amount of applied toner |
|---|---|---|---|---|---|---|---|
| 255 | 255 | 255 | 0% | 0% | 0% | 0% | 0% |
| 216 | 255 | 255 | 15% | 0% | 0% | 0% | 15% |
| 180 | 255 | 255 | 29% | 0% | 0% | 0% | 29% |
| 144 | 255 | 255 | 44% | 0% | 0% | 0% | 44% |
| 108 | 255 | 255 | 58% | 0% | 0% | 0% | 58% |
| 72 | 255 | 255 | 72% | 0% | 0% | 0% | 72% |
| 36 | 255 | 255 | 86% | 0% | 0% | 0% | 86% |
| 0 | 255 | 255 | 100% | 0% | 0% | 0% | 100% |

In addition, the next table 3 shows a color conversion table for toner save mode.

TABLE 3

| R | G | B | C | M | Y | K | amount of applied toner |
|---|---|---|---|---|---|---|---|
| 255 | 255 | 255 | 0% | 0% | 0% | 0% | 0% |
| 216 | 255 | 255 | 15% | 0% | 0% | 0% | 15% |
| 180 | 255 | 255 | 29% | 0% | 0% | 0% | 29% |
| 144 | 255 | 255 | 44% | 0% | 0% | 0% | 44% |
| 108 | 255 | 255 | 58% | 0% | 0% | 0% | 58% |
| 72 | 255 | 255 | 72% | 0% | 0% | 0% | 72% |
| 36 | 255 | 255 | 86% | 0% | 0% | 0% | 86% |
| 0 | 255 | 255 | 100% | 0% | 0% | 0% | 100% |

Since the amount of applied toner in both of them is data within 100% as the limit value, there is no difference in data between both the tables.

On the other hand, in regard to data of lattice points from white (W) to blue (B), a color conversion table for regular mode is shown in Table 4, and a color conversion table for toner save mode is shown in Table 5.

TABLE 4

| R | G | B | C | M | Y | K | amount of applied toner |
|---|---|---|---|---|---|---|---|
| 255 | 255 | 255 | 0% | 0% | 0% | 0% | 0% |
| 216 | 216 | 255 | 15% | 15% | 0% | 0% | 31% |
| 180 | 180 | 255 | 29% | 29 | 0% | 0% | 59% |
| 144 | 144 | 255 | 44% | 44% | 0% | 0% | 87% |
| 108 | 108 | 255 | 58% | 58% | 0% | 0% | 115% |
| 72 | 72 | 255 | 72% | 72% | 0% | 0% | 144% |
| 36 | 36 | 255 | 86% | 86% | 0% | 0% | 172% |
| 0 | 0 | 255 | 100% | 100% | 0% | 0% | 200% |

TABLE 5

| R | G | B | C | M | Y | K | amount of applied toner |
|---|---|---|---|---|---|---|---|
| 255 | 255 | 255 | 0% | 0% | 0% | 0% | 0% |
| 216 | 216 | 255 | 15% | 15% | 0% | 0% | 31% |
| 180 | 180 | 255 | 29% | 29 | 0% | 0% | 59% |
| 144 | 144 | 255 | 44% | 44% | 0% | 0% | 87% |
| 108 | 108 | 255 | 45% | 45% | 0% | 0% | 90% |
| 72 | 72 | 255 | 46% | 46% | 0% | 0% | 92% |
| 36 | 36 | 255 | 48% | 48% | 0% | 0% | 96% |
| 0 | 0 | 255 | 50% | 50% | 0% | 0% | 100% |

Here, in the color conversion table for regular mode in Table 4, an amount of applied toner of RGB=(108, 108, 255) is 115%, which exceeds 100%. Therefore it is understood that Table 4 is different in data subsequent thereto from a color conversion table for toner save mode in Table 5 in which a limit value of the amount of applied toner is 100%.

As described above, the amount of applied toner in a primary color in CMYK or in a highlight area having a low density does not exceed 100% even in the color conversion table for regular mode. Therefore the color conversion table for toner save mode has no difference in the primary color in CMYK or the highlight area from the color conversion table for regular mode.

On the other hand, in a color gamut having large applied amounts of multi-colors of CMYK, the toner consumption amount is reduced by reducing the applied amount of the data on the lattice point. That is, the color conversion processing unit 301 converts the bit map image 208 to color space image data of CMYK in such a manner that an applied amount of the recording material by image formation of each pixel is equal to or less than a threshold. By providing the limit to the applied amount in this manner, the reduction of the amount of applied toner can be made without degradation in a quality level of an image as compared with a method for changing the density level.

In regard to the color conversion table for toner save mode, the upper limit of the applied amount is not limited to 100%, but any upper limit value may be defined.

In addition, in the above example, the reduction is made only to an area having large amount of applied toner, but the reduction method is not limited thereto. The amount of applied toner on each lattice point may be reduced by performing space compression of the color gamut or the like at the time of executing the color conversion processing.

Referring back to the explanation of the block diagram in FIG. 3, a density adjustment processing is executed to the image data of CMYK subjected to the color conversion processing in a density adjustment processing unit 302 (second processing means), and an output density level of CMYK is associated with an input density level thereof.

Examples of a specific processing method include a method for using a density adjustment table for associating the input density level with the output density level of each color of CMYK, and a method for finding the association with calculation using a function. In the density adjustment processing unit 302, gamma adjustment is made for adjusting density characteristics specific to the printer engine. Further, in the density adjustment processing unit 302, the processing for changing the density level corresponding to a density adjustment value set by a toner consumption amount control unit 211 is also executed at a toner save mode time. When the density adjustment value is not set by the toner consumption amount control unit 211 (for example, when a prediction amount of the toner consumption amount, to be described later, achieves a reduction target value), the processing for changing the density level by the density adjustment processing unit 302 is not executed. The details of a specific processing of the density adjustment processing by the density adjustment value will be described later.

A halftone processing unit 303 executes a halftone processing to the image data of CMYK after the density adjustment processing in the density adjustment processing unit 302. In many cases the image forming unit 210 can regularly output only in low gradation levels such as 2, 4, or 16 gradation levels. Therefore the halftone processing is executed in the halftone processing unit such that the stable halftone expression can be made also in the image forming unit 210 in which only a few gradation levels can be outputted.

Figure 6:
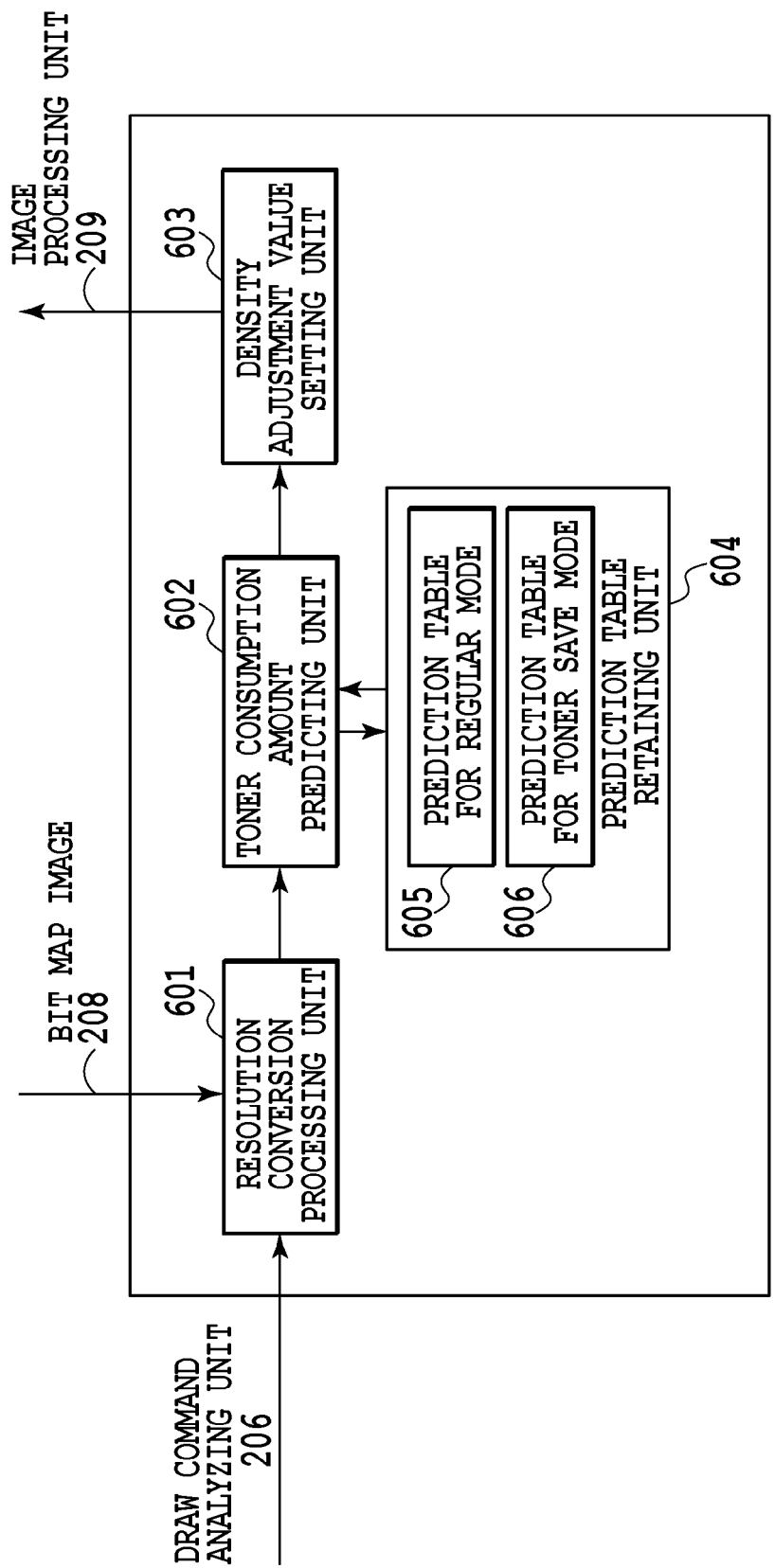
FIG. 6 is a block diagram showing a functional configuration of a toner consumption control unit.

FIG. 6 is a block diagram showing a functional configuration of the toner consumption amount control unit 211. In a case where the color conversion processing by the color conversion table is executed, a ratio between a toner amount consumed at the time of applying the color conversion table for regular mode and a toner amount consumed at the time of applying the color conversion table for toner save mode differs for each image data to be inputted. That is, a reduction ratio of the consumption toner amount by the color conversion processing unit 301 differs for each image data to be inputted. This is because a reduction amount of the toner consumption amount in the color conversion table for toner save mode differs for each RGB to be inputted.

Therefore in a case where a target value of the toner reduction ratio in the toner save mode is set, it is required to find a prediction value of the toner consumption amount in regard to an entire image data after the color conversion by the color conversion processing unit 301 in each of the regular mode and the toner save mode. The reduction amount of the toner consumption amount can be predicted from the prediction value. The toner consumption control unit 211 executes processing of the prediction of the toner consumption amount, a setting of the density adjustment corresponding to the prediction value, and the like.

A resolution conversion processing unit 601 executes a resolution conversion processing of the bit map image 208 subjected to the rendering processing in a case where the toner save mode is set and the prediction of the toner consumption amount is required. For example, in a case where the bit map image is produced at a resolution (for example, 600 dpi) corresponding to capabilities of the image forming unit, the resolution conversion processing unit 601 executes a contraction processing (for example, contraction to 300 dpi or 200 dpi) to the bit map image. However, the resolution conversion processing is a processing to be applied in consideration of a processing speed or a use memory amount in a toner consumption predicting unit 602 to be applied next, and is, in some cases, not applied in a case where the processing performance is sufficiently achieved or there is no problem with the memory usage amount.

The toner consumption amount predicting unit 602 predicts a consumption amount of the toner (recording material) at the time of forming an image of (to) the bit map image subjected to resolution conversion in the resolution conversion processing unit 601, by using prediction tables retained in a prediction table retaining unit 604. The prediction of the toner consumption amount in a case where the color conversion table for regular mode is used in the color conversion processing unit 301 is made by using the prediction table for regular mode. Likewise the prediction of the toner consumption amount in a case where the color conversion table for toner save mode is used in the color conversion processing unit 301 is made by using the prediction table for toner save mode.

Also the prediction of the toner consumption amount predicting unit 602 is preferably made by the three-dimensional LUT and the three-dimensional interpolation processing in the same way with the color conversion processing unit 301. The prediction table of each may retain only data of the amount of applied toner corresponding to RGB inputted, to the color conversion tables as shown in Table 1 to Table 5. In this manner, the toner consumption amount of each pixel is found for (to) the bit map image of RGB to be inputted, and the prediction of the toner consumption amount in the input image data is made from (by) an accumulated total of all the pixels.

Also in the above example, the color conversion table and the prediction table respectively retain different data, but the color conversion table includes the prediction table therein from the content. Therefore there is a possibility that the toner consumption amount is predicted from the color consumption table and the prediction table is not retained separately.

In the toner consumption amount predicting unit 602, at the time of using the color conversion table for regular mode and the color conversion table for toner save mode, an accumulated total of toner consumption amounts in the respective pixels of each mode is found. A reduction ratio of the toner consumption amount predicted in each mode is found.

For example, it is assumed that a toner amount to be assumed in a case of using a table for regular mode in the color conversion processing is indicated at 100 and a toner amount to be assumed in a case of using a table for toner save mode in the color conversion processing is indicated at 70. In this case, the reduction of the toner consumption amount corresponds to a reduction of 30%.

On the other hand, as described above, in many cases the reduction ratio of the consumption amount of the toner is in advance set relative to the regular mode at the time of setting the toner save mode. In the present embodiment, in a case where the reduction ratio in (at) the toner save mode is in advance indicated as (at) a reduction of 50%, the target cannot be achieved by a reduction of 30% shown as the example. Therefore in a density adjustment value setting unit 603, an adjustment value is further set to the density adjustment processing executed in the density adjustment processing unit 302 such that the target can be achieved. The adjustment value in the present example is specially set to 50/70=0.71. That is, the setting, in which a ratio in the density value of the output density level to the input density level is 0.71, is applied to the density adjustment processing unit 302. Therefore the density adjustment processing unit 302 executes the density adjustment processing corresponding to a reduction target value of the toner and a prediction value of the toner consumption amount.

Figure 7:
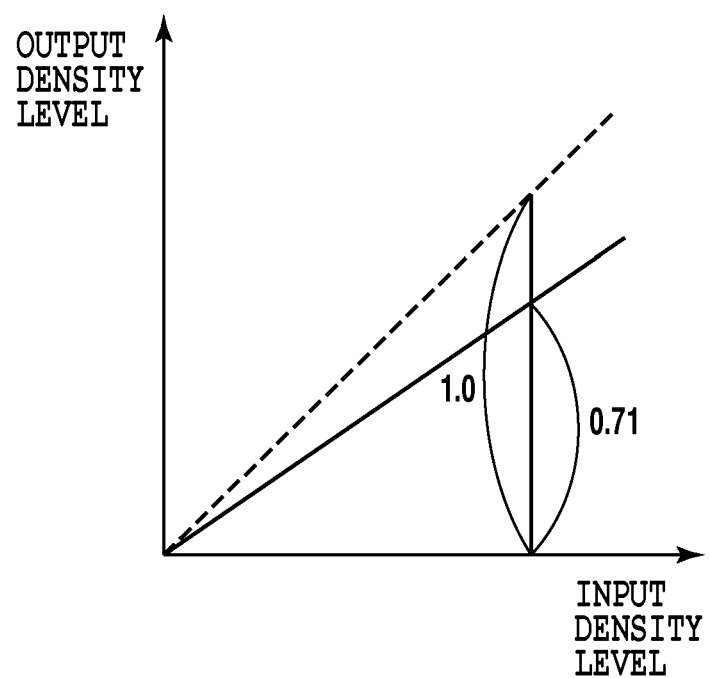
FIG. 7 is a diagram showing a relation between an input density level and an output density level in a density adjustment processing unit.

FIG. 7 shows a density adjustment table specially set in this example. Herein, the density adjustment table is shown as an example, but the adjustment may be made by calculation. In FIG. 7, an adjustment table shown by (in) a dotted line shows a table in which the input density level is equal to the output density level. In addition, an adjustment table shown by (in) a solid line shows a table in which a ratio of the output density level to the input density level is 0.71.

In a consumption amount reduction processing of toner in the color conversion processing unit 301, a ratio of (in) a toner consumption amount between (at) a regular mode and (at) a toner save mode differs upon input image data. On the other hand, in a consumption amount reduction processing of toner in the density adjustment processing unit 302, a ratio of (in) a toner consumption amount can be arbitrarily set by uniquely executing the processing to image data.

That is, it is difficult to control a reduction amount in the consumption amount of the toner to an intended amount by providing an upper limit value of the amount of applied toner in the color conversion processing unit 301. It is possible to control the reduction amount if a plurality of color conversion parameters are prepared, but in a case where there is some limit to a mounting dimension or the like, realization of the color conversion parameters is difficult. However, the reduction of the consumption amount of the toner by the color conversion processing unit 301 has an advantage that the reduction of the toner consumption amount can be made without degradation in a quality level of an image, as described above. On the other hand, the consumption amount reduction processing of the toner by lowering the density level in the density adjustment processing unit 302 can easily control the reduction amount in the consumption amount of the toner. However, it has a disadvantage that in some cases the image quality degrades when the density level is lowered.

Therefore, according to the present embodiment, the color conversion table for toner save mode is applied and the density adjustment table is changed as needed to obtain the toner reduction effect by the color conversion processing. Thereby the reduction amount can be flexibly controlled only by retaining a single color conversion table. Further, according to the present embodiment, degradation in image quality can be reduced as compared with a case of reducing the consumption amount of the toner only by lowering the density level.

Figure 8:
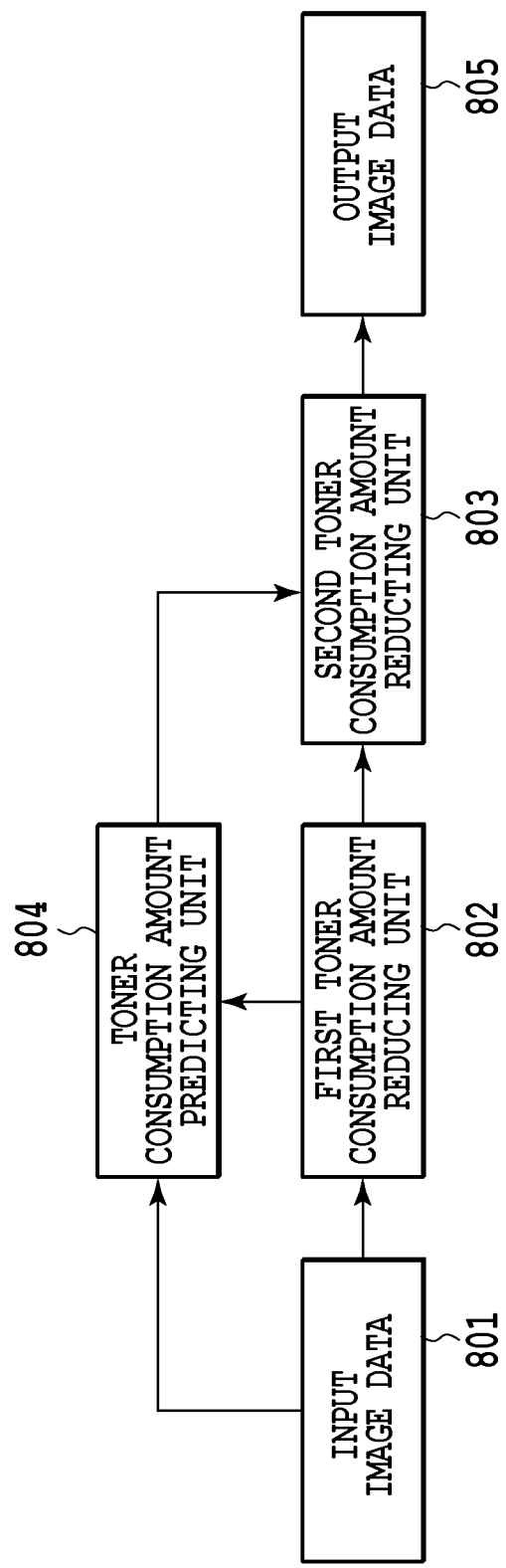
FIG. 8 is a block diagram showing a functional configuration of an image processing apparatus according to an embodiment.

FIG. 8 is a block diagram showing a functional configuration of the image processing device according to the present embodiment. First toner consumption amount reducing unit 802 executes a processing for reducing a consumption amount of toner at image forming, on (to) input image data 801. In the present embodiment, the first toner consumption amount reducing unit 802 is realized in the color conversion processing unit 301, and the consumption amount of the toner differs for each input image data. In addition, the first toner consumption amount reducing unit 802 assumes a processing capable of relatively maintaining an image quality level even if the consumption amount of the toner is reduced.

On the other hand, second toner consumption amount reducing unit 803 executes a processing for consumption amount reduction of the toner on (to) output image data from the first toner consumption amount reducing unit 802, corresponding to a prediction value generated by toner consumption amount predicting unit 804. The second toner consumption amount reducing unit 803 is realized in the density adjustment processing unit 302 in the present embodiment, and is a processing for uniquely changing the density level of an entire image. In the second toner consumption amount reducing unit 803, the image quality level is lowered corresponding to the reduction of the consumption amount of the toner, but the density level (signal value of image data) is linearly changed regardless of the input image data, making it possible to reduce the toner consumption amount.

In regard to the reduction processing in the first toner consumption amount reducing unit 802, the reduction amount of the toner is predicted in the toner consumption amount predicting unit 804 to change the setting of the second toner consumption amount reducing unit 803 capable of linearly reducing the toner. In this manner, the toner consumption amount can be controlled in a high quality level and flexibly.

The effect to the image quality in a case of using the image processing according to the present embodiment will be hereinafter explained.

Hereinafter, as an example, a reduction target of the toner consumption amount in the toner save mode is set as a reduction of 50%. In addition, the realization of the conventional toner save mode is assumed to be performed by the density adjustment processing.

Here, in the conventional toner save mode, the density level is uniquely lowered for (to) a primary color or a mixed color such as a secondary color or a third color of CMYK. In a case where the target of the toner save mode is set as a reduction of 50%, the density ratio of the output density level to the input density level results in being uniquely lowered by 0.5.

On the other hand, there will be considered a case where the reduction target of the toner consumption amount in the toner save mode is set as a reduction of 50% according to the present method. It is assumed that in a case of applying the color conversion table for toner save mode in the color conversion processing to the input image data, as shown in the previous example, the toner consumption amount is reduced by 30%.

Figure 9A:
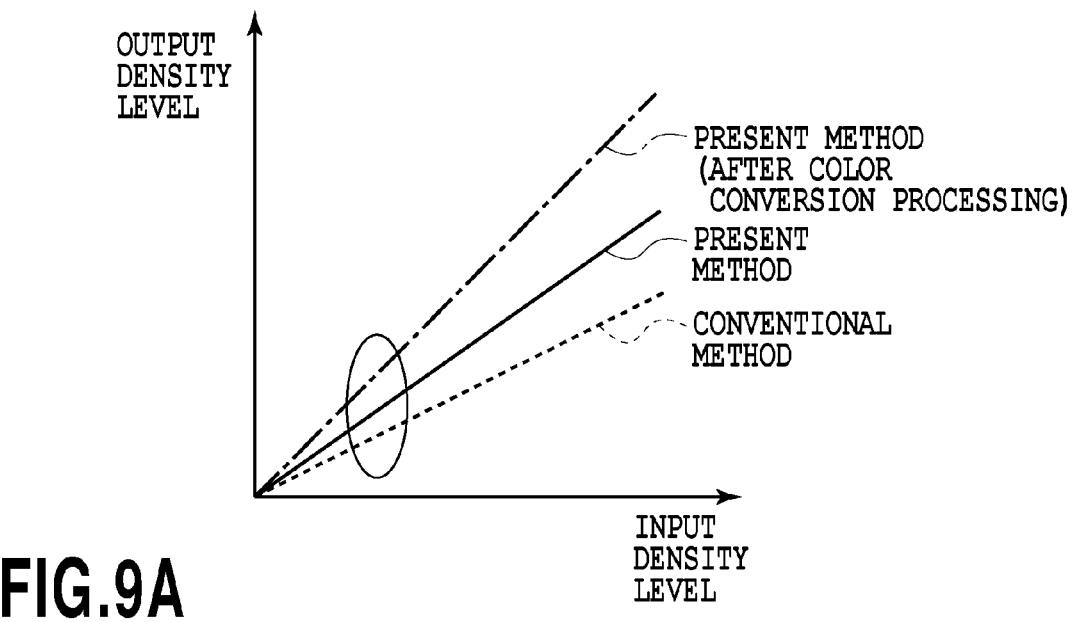
FIG. 9A and FIG. 9B are diagrams explaining an effect in an image quality according to an embodiment in the present invention.

FIG. 9A shows a relation between an input density level and an output density level of cyan as a primary color in the conventional toner save mode, and a relation between an input density level and an output density level of cyan as a primary color in the present method. The dotted line shows a relation between the input density level and the output density level by the conventional method, and the solid line shows a relation between the input density level and the output density level by the present method. In addition, the broken line shows a density level of cyan after the color conversion processing in the present method.

It is seen from FIG. 9A that the density of an entire image is lowered in the conventional toner save mode. As a result, it is understood that degradation in an image quality level is caused particularly in a highlight (encircled) area having a low density. On the other hand, since the amount of applied toner in the color conversion processing is equal to or less than a limit value in the toner save mode using the present method, the density level of the output relative to the regular mode is not lowered. Further, the density adjustment processing is executed in the density adjustment processing unit, but the density level is not lowered as much as the conventional method, thus maintaining the image quality level.

Figure 9B:
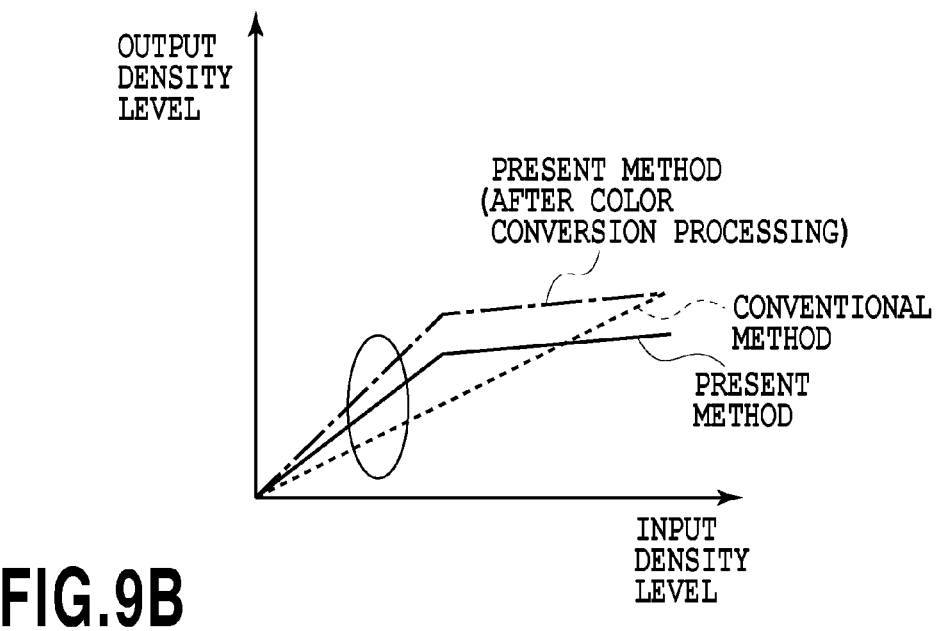

Likewise, FIG. 9B shows a relation between an input density level and an output density level of cyan in blue as a secondary color in which cyan and magenta are mixed.

Here, likewise the dotted line shows a relation between an input density level and an output density level by the conventional method, and the solid line shows a relation between an input density level and an output density level by the present method. The broken line shows a density level of cyan in blue after the color conversion processing in the present method.

In the toner save mode in the conventional method, the density in an entire image is lowered also for (in) the secondary color in the same way with the primary color. On the other hand, in the toner save mode using the present method, first, the density is lowered only in a high density area having many amounts of applied toner in the color conversion processing. Further, the density adjustment processing is executed in the density adjustment processing unit, but a decrease in density, particularly in the highlight (encircled) area is smaller as compared with the conventional method, thus maintaining the image quality level.

The reduction ratios in the consumption amount of the toner by the color conversion processing unit 301 of (in) a plurality of input image data differ for respective input image data even with an application of the same color conversion table. Therefore it is preferable that the adjustment value by the density adjustment processing unit 302 switches for each input image data. On the other hand, in some cases the input image data is configured of image data of a plurality of pages. On this occasion, there are some cases where the performance deteriorates when the toner consumption amount is predicted for each page to calculate a ratio of the consumption amount. In this case, in regard to the density adjustment value calculated in the density adjustment value setting unit 603, a value calculated for (to) any single page of a plurality of pages, for example, for (to) the first page, may be used as the density adjustment value for (to) all the pages. Whether a density adjustment value calculated for (to) some page is used for all the pages or density adjustment values for (to) all the pages are calculated, which are respectively used for the corresponding page, may be arbitrarily set by a setting unit.

In addition, in the present embodiment, the setting of the toner save mode is made through the printer driver in the host computer, but the setting method is not uniquely determined, and may be set by the operating unit 106 in the controller.

According to the embodiment of (in) the present invention as described above, the toner consumption amount at the time of applying the first toner consumption amount reducing unit is predicted corresponding to the inputted image data. Here, the first toner consumption amount reducing unit performs (is) a processing for reducing the toner consumption amount and maintaining the image quality level, such as the color conversion processing using the color conversion table.

Next, the setting of the second toner consumption amount reducing unit is changed based upon the predicted toner consumption amount and a target value of the toner consumption amount. Here, the second toner consumption amount reducing unit is a unit which can set any output density level relative to the input density level by linearly changing the density level. By applying the first toner consumption amount reducing unit and the second toner consumption amount reducing unit in this manner, there can be provided the image processing device in which degradation in an image quality level can be suppressed in the toner save mode processing, and the effect of the consumption amount reduction of the toner desired by a user can be obtained at low costs.

Embodiment 2

The reduction target of the toner consumption amount in the toner save mode is fixed, for example, 50% of (to) the regular mode in Embodiment 1. However, since it is possible to arbitrarily balance the image quality level with the toner consumption amount, preferably the consumption amount of the toner can be flexibly set. Therefore in Embodiment 2 of the present invention, a target value setting unit is provided for setting a reduction target to the toner consumption amount.

Hereinafter, an explanation will be made of an example of realizing the target value setting unit by the printer driver performing the print setting to the toner save mode and the like in Embodiment 1. That is, in Embodiment 2, when the printer driver generates a draw command based upon a digital document, the command including the setting of the toner save mode is generated. Along with it, the printer driver also sets a target value of the toner save arbitrarily set.

Figure 10:
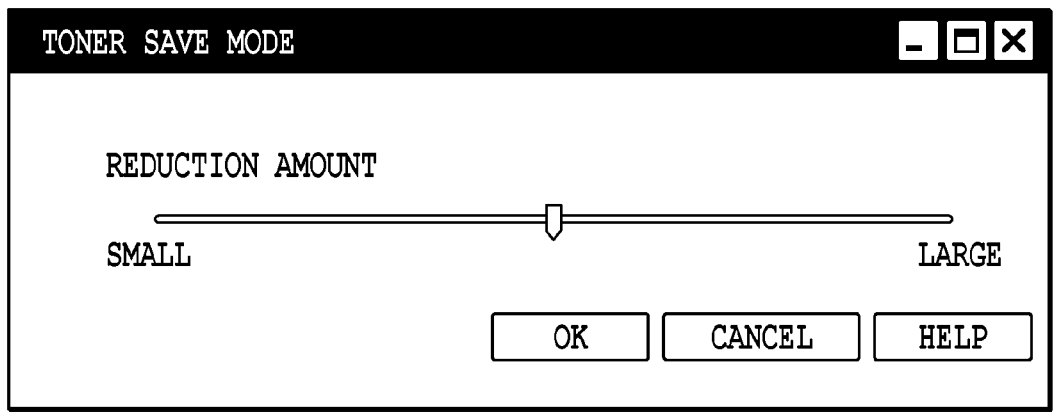
FIG. 10 is a diagram showing an example of the target value setting unit according to Embodiment 2.

FIG. 10 shows an example of the target value setting unit in Embodiment 2. The target value setting unit shown in FIG. 10 is a screen displayed on an operating unit for setting the target value in the toner save mode (in particular to enable a user to set the target value). For example, in a case where a default target value in the toner save mode is set as a reduction of 50%, and there is no problem even if the toner consumption amount is larger than it, the reduction amount is set smaller via (by) the operating unit. On the other hand, in a case where the toner consumption amount is desired to be "smaller", the reduction amount is set "larger" via (in) the operating unit.

Also in a case where the reduction target of the toner consumption amount is set via (in) the target value setting unit, the subsequent processing is the same as in Embodiment 1. That is, in the printer controller, the density adjustment value is set from the arbitrarily set reduction target value of the toner consumption amount by the processing in the toner consumption amount control unit.

When a toner amount consumed in a case of using a table for regular mode in the color conversion processing in regard to some input image data in the same way with Embodiment 1 is set to 100, a prediction value of a toner amount consumed in a case of using a table for toner save mode is assumed to be 70. In this case, the reduction of the toner consumption amount is a reduction of 30%.

Here, in a case where the reduction target of the toner consumption amount is less than a reduction of 30% in the target value setting unit, in the setting of the density adjustment value in the density adjustment value setting unit, a ratio of the output density level to the input density level is one. That is, the density adjustment in (by) the toner save mode is not made in regard to the density level after the color conversion processing. On the other hand, in a case where the reduction target of the toner consumption amount is more than a reduction of 30%, when the target value is [save_value], the ratio is calculated by [save_value]/70. For example, in a case where the reduction target of the toner consumption amount is set to 65%, the density adjustment value of (100−65)/70=0.5 is set in the density adjustment processing unit.

According to Embodiment 2 of (in) the present invention as described above, the toner consumption amount at the time of applying the first toner consumption amount reducing unit is predicted corresponding to the inputted image data. Here, the first toner consumption amount reducing unit is a processing for reducing the toner consumption amount and maintaining the image quality level, such as the color conversion processing using the color conversion table. Further, according to Embodiment 2, the target value of the toner consumption amount can be set, and the setting of the second toner consumption amount reducing unit can be changed based upon the predicted toner consumption amount and the target value of the toner consumption amount. Here, the second toner consumption amount reducing unit is a unit which can set any output density level to the input density level by linearly changing the density level.

In this manner, in the toner save mode processing, the toner consumption amount is reduced by applying the first toner consumption amount reducing unit and the second toner consumption amount reducing unit. By doing so, there can be provided the image processing device in which degradation in an image quality level can be suppressed, and the effect of the consumption amount reduction of the toner desired by a user can be obtained at low costs.

Embodiment 3

In Embodiment 1 and Embodiment 2 of (in) the present invention, the color conversion processing unit, the density adjustment processing unit, the toner consumption amount control unit are configured inside the printer controller. Alternatively, the processing executed in these processing units can be realized also by (on) the host computer.

Hereinafter, in Embodiment 3 in the present invention, an explanation will be made of an embodiment where an image processing device according to the present invention is mounted in a host computer.

Figure 11:
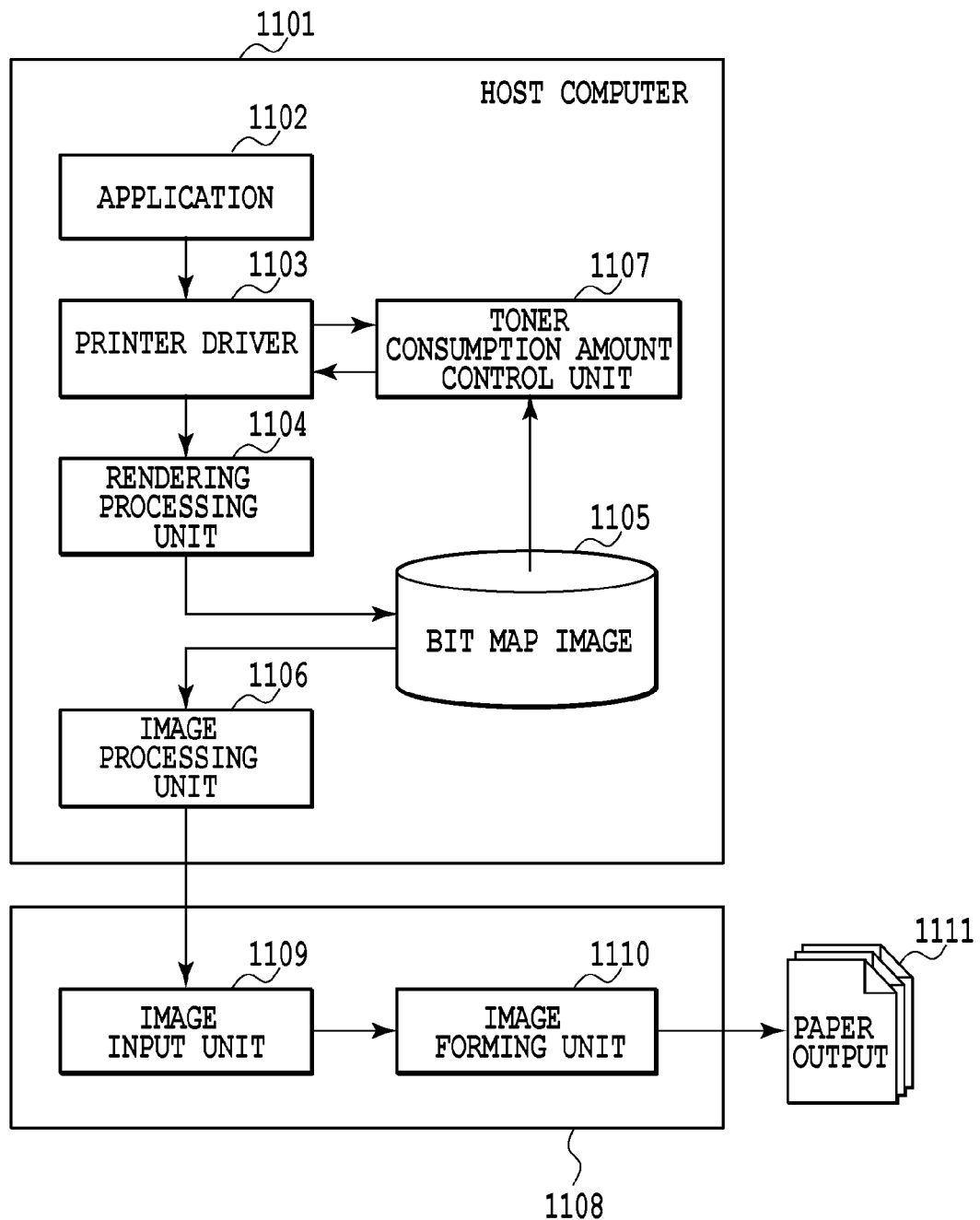
FIG. 11 is a block diagram showing the configuration of an image processing apparatus according to Embodiment 3.

FIG. 11 is a block diagram showing the configuration of an image processing device according to Embodiment 3 in the present invention. A host computer 1101, uses an application 1102 operable on the host computer in the same way as (with) Embodiment 1 to produce page layout documents, word processor documents, graphic documents and the like.

These digital documents produced by the application are sent to a printer driver 1103, wherein draw objects are generated based upon the digital documents. In addition, in the printer driver 1103, print settings in regard to print copies, a page layout, and print order are generated as control commands at the time of generating the draw object. These print settings include the setting of the toner save mode for reducing the consumption amount of the toner for printing, to the regular mode for performing a regular print. In the setting of the toner save mode, the information that an operating mode is a toner save mode is included, and also, for example, as shown in Embodiment 2, a target value of the toner save, for example, a reduction ratio of the consumption amount of toner in the toner save mode relative to the regular mode is arbitrarily set. The target value of the toner save set herein is sent to a toner consumption amount control unit 1107.

A rendering processing unit 1104 executes a rendering processing on (to) the draw object generated in the printer driver 1103 to generate a bit map image 1105. An image processing unit 1106 executes image processing such as a color conversion processing, a density adjustment processing, a halftone processing, and the like to the bit map image 1105 generated by the rendering processing, which is thereby converted into print image data capable of being outputted in an image forming unit 1110. The processing to be applied in the image processing unit 1106 is changed in response to the set print settings, for example, a regular mode, a toner save mode, and the like. The details of the processing in the image processing unit 1106 are equivalent to those in the image processing unit 209 shown in Embodiment 1.

The print image data generated by being converted into a predetermined image format in the image processing unit 1106 is inputted as a video signal to a controller 1108, and is transferred to the image forming unit 1110 by an image input unit 1109 for a printing processing. That is, the print image data is subjected to the processing of exposure, development, transfer, and fixation to complete a print thereof on a paper surface as a transfer material.

The processing of the toner consumption amount control unit 1107 in the present embodiment is substantially equivalent to that of the toner consumption amount control unit 211 shown in Embodiment 1. That is, the resolution conversion is made to the bit map image 1105, to which the toner consumption amount prediction tables for regular mode and toner save mode are applied, and thereby a ratio of the toner consumption amount in each color conversion processing is found. Further, by comparing the reduction target of the toner consumption amount, inputted from the printer driver 1103, with the prediction amount of the toner consumption amount a density adjustment value is set for use in the density adjustment processing to be executed by (in) the image processing unit 1106.

On the other hand, in the present embodiment, the reduction amount of the toner consumption amount achieved only by the color conversion processing can be sent to the printer driver. That is, the reduction amount of the toner consumption amount at a stage where the reduction processing of the toner consumption amount is not (yet) executed by the density adjustment processing can be notified through the printer drive to a user.

Therefore according to the present embodiment, not only the target value is arbitrarily set as shown in Embodiment 2, but also notifying unit is provided for displaying the effect in the toner save mode.

Figure 12A:
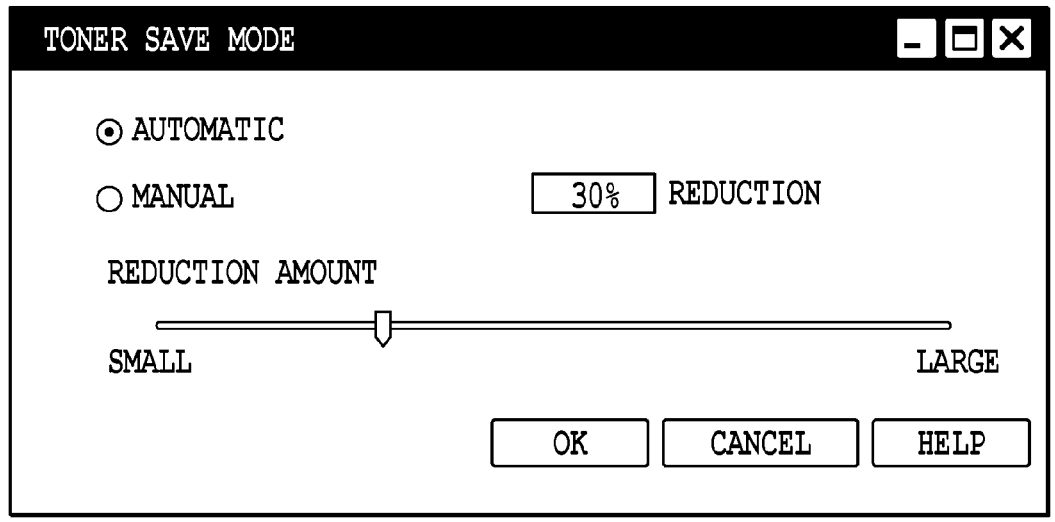
FIG. 12A and FIG. 12B are diagrams showing an example of the target value setting unit according to Embodiment 3.
Figure 12B:
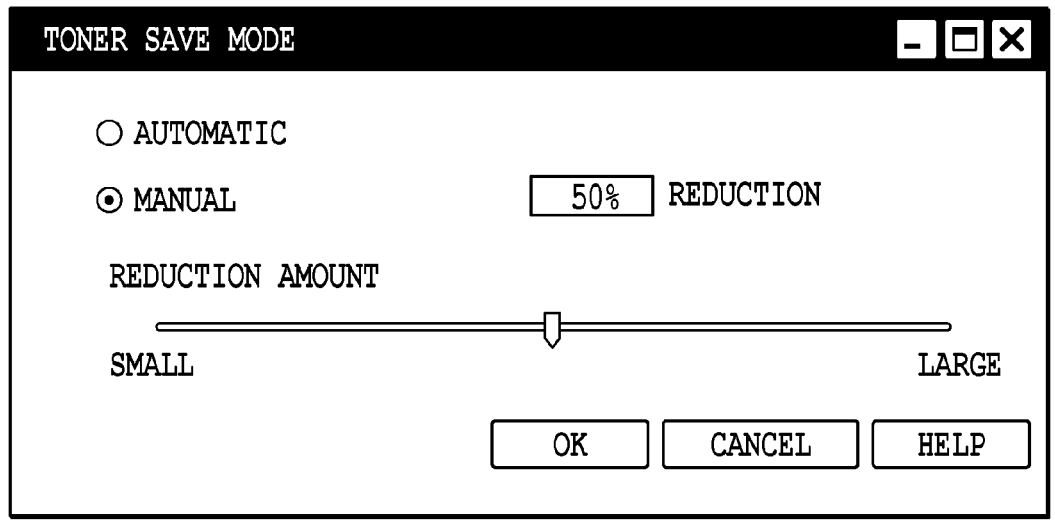

FIG. 12A and FIG. 12B show an example of the operating unit in the toner save mode according to the present embodiment.

In the toner save mode in the present invention, the image quality level at the reduction processing time of the toner consumption amount realized only by the color conversion processing is essentially the highest. Therefore the prediction value of the toner consumption amount which can be reduced by the reduction processing of the toner consumption amount only by the color conversion processing is first displayed through the printer driver on the operating unit.

FIG. 12A shows a reduction amount of the toner consumption amount realized only by the color conversion processing at the time of setting an "automatic" setting in the operating unit on the printer driver. Further, in FIG. 12B, an arbitrary reduction target of the toner consumption amount can be, as shown in Embodiment 2, set by switching the reduction target of the toner consumption amount to a "manual" setting.

As described above, according to Embodiment 3 in the present invention, the example of realizing the processing of the toner save mode shown in each of Embodiment 1 and Embodiment 2 on the host computer is shown. In Embodiment 3, further, the toner consumption amount at the time of applying the first toner consumption amount reducing unit is predicted corresponding to the inputted image data, and the prediction value is displayed. By doing so, it is possible to provide the image processing device which can more flexibly suppress degradation in an image quality level and can obtain the effect of the consumption amount reduction of the toner desired by a user at low costs.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-176191, filed Aug. 11, 2011, which is hereby incorporated by reference herein in its entirety.

What is claimed is:

1. An image processing apparatus comprising:
   a color conversion unit configured to perform color conversion in such a manner that density of image data after the color conversion is decreased more largely in a high density area as compared with a low density area in the image data;
   an adjustment unit configured to perform, in a case where a reduction ratio of recording material based on the image data after the color conversion by the color conversion unit has not reached a reduction target value, adjustment processing which linearly decreases a signal value of the image data so that the reduction ratio of recording material reaches the reduction target value,
   wherein when the reduction ratio of recording material reaches the reduction target value, the adjustment processing unit does not perform the adjustment processing.

2. An image processing apparatus according to claim 1, wherein a lookup table (LUT) is used to perform the color conversion.

3. An image processing apparatus according to claim 1, further comprising:
   a setting unit configured to set the reduction target value.

4. An image processing apparatus according to claim 1, further comprising:
   a predicting unit configured to predict a consumption amount of recording material in image formation based on the image data after the color conversion by the color conversion unit;
   a display unit configured to display the consumption amount of recording material predicted by the predicting unit.

5. An image processing apparatus according to claim 1, comprising:
   a limit unit configured to set a limit to the consumption of the recording material, wherein
   when the limit is set, the color conversion unit and the adjustment unit perform the color conversion and the adjustment processing.

6. An image processing apparatus according to claim 1, wherein
   the adjustment unit, when the image data is formed of plural pages, applies an adjustment value calculated for any one of the plural pages to all the plural pages to perform the adjustment processing.

7. A non-transitory computer-readable storage medium storing a program for causing a computer to function as the image processing apparatus according to claim 1.

8. An image processing method comprising:
   performing color conversion in such a manner that density of image data after the color conversion is decreased more largely in a high density area as compared with a low density area in the image data;
   performing adjustment processing which linearly decreases a signal value of the image data so that a reduction ratio of recording material reaches a reduction target value, if the reduction ratio of recording material based on the image data after the color conversion has not reached the reduction target value, wherein when the reduction ratio of recording material reaches the reduction target value, the adjustment processing unit does not perform the adjustment processing.

* * * * *